United States Patent [19]
Lowrance

[11] 3,808,731
[45] May 7, 1974

[54] AUTOMATIC DOWN RIGGER

[75] Inventor: Darrell J. Lowrance, Tulsa, Okla.

[73] Assignee: Lowrance Electronics, Inc., Tulsa, Okla.

[22] Filed: Jan. 15, 1973

[21] Appl. No.: 323,450

[52] U.S. Cl. .................................. 43/4, 43/42.22
[51] Int. Cl. .......................................... A01k 31/06
[58] Field of Search ........ 43/4, 43.12, 43.15, 42.22, 43/26.1

[56] References Cited
UNITED STATES PATENTS

| | | | |
|---|---|---|---|
| 3,628,274 | 12/1971 | Wojahn | 43/4 |
| 2,709,867 | 6/1955 | Routh | 43/26.1 |
| 3,031,788 | 5/1962 | Shannon | 43/4 |
| 2,749,649 | 6/1956 | Fitzsimmons | 43/43.12 |

*Primary Examiner*—Louis G. Mancene
*Assistant Examiner*—L. Q. Lever
*Attorney, Agent, or Firm*—Head & Johnson

[57] ABSTRACT

In trolling a lake for fish it is desirable to troll at a depth where the temperature is ideal for the species of fish being sought. This abstract describes an apparatus in which a temperature sensor is carried in a probe attached to a cable depending from a motor driven reel carried by the trolling boat. The temperature sensor is a thermo-resistive element which is connected to a servo amplifier which controls the direction of rotation of the reel, so that the probe cable can be lengthened to permit the probe to go to a greater depth or can be shortened to bring the probe to a shallower depth, so as to adjust the position of the probe to water of the desired temperature.

6 Claims, 2 Drawing Figures

3,808,731

AUTOMATIC DOWN RIGGER

BACKGROUND OF THE INVENTION

It has long been known to fishermen that fish prefer to swim in a selected depth in the water of a lake or stream where the temperature is most desirable from their point of view. Knowing the temperature range selected by the fish, a fisherman, by means of a temperature sensor, can probe for the proper depth to find water of the selected temperature and set his fish hooks at that depth. However, in trolling it becomes important to have some automatic means for controlling the depth of the probe because as the boat moves in a horizontal direction the depth for the optimum water temperature is not necessarily constant.

SUMMARY OF THE INVENTION

This invention lies in the field of apparatus for fishermen. More particularly, it is concerned with temperature measuring apparatus. Still more particularly, this invention describes automatically controlled cable feed means designed to troll a temperature sensing element at a depth corresponding to the ideal temperature for location of fish of a given species.

It is a primary object of this invention to provide an automatic apparatus for trolling a temperature sensing element at a variable depth behind a trolling boat so that the sensing elements will troll at such a depth as to be in water of a desired selected temperature.

This and other objects are realized and the limitations of the prior art are overcome in this invention in which the temperature sensing, thermo-resistive element is housed in a probe which is of negative buoyancy so that it will seek its proper depth in the water. The probe is carried by means of a cable to a motor driven reel on the trolling boat. Reversible motor means are provided for reeling-out and reeling-in the trolling cable. It is particularly desirable to have a cable which has, as its core, electrical conductors for transmitting the signal from the thermal sensor to the trolling boat. These wires are then applied to a servo system for controlling the motor which drives the reel. Fish hook means are attached to the trolling probe and, if desired, a fishing line is also connected to the probe at one end and to the boat at the other end.

Since, in general, the temperature of the water in a lake or other fishing water decreases in temperature with increase in depth, the servo amplifier reading the error signal, or difference in temperature of the probe and the desired temperature, can control the reel motor to reel-out and thus lower the probe in the water, or reel-in and lift the probe in the water, so as to seek an optimum position wherein the water temperature is the desired temperature.

BRIEF DESCRIPTION OF THE DRAWINGS

These and other objects of this invention and a better understanding of the principles and details of the invention will be evident from the following description taken in conjunction with the appended drawings, in which.

DESCRIPTION OF THE PREFERRED EMBODIMENT

Figure 1:
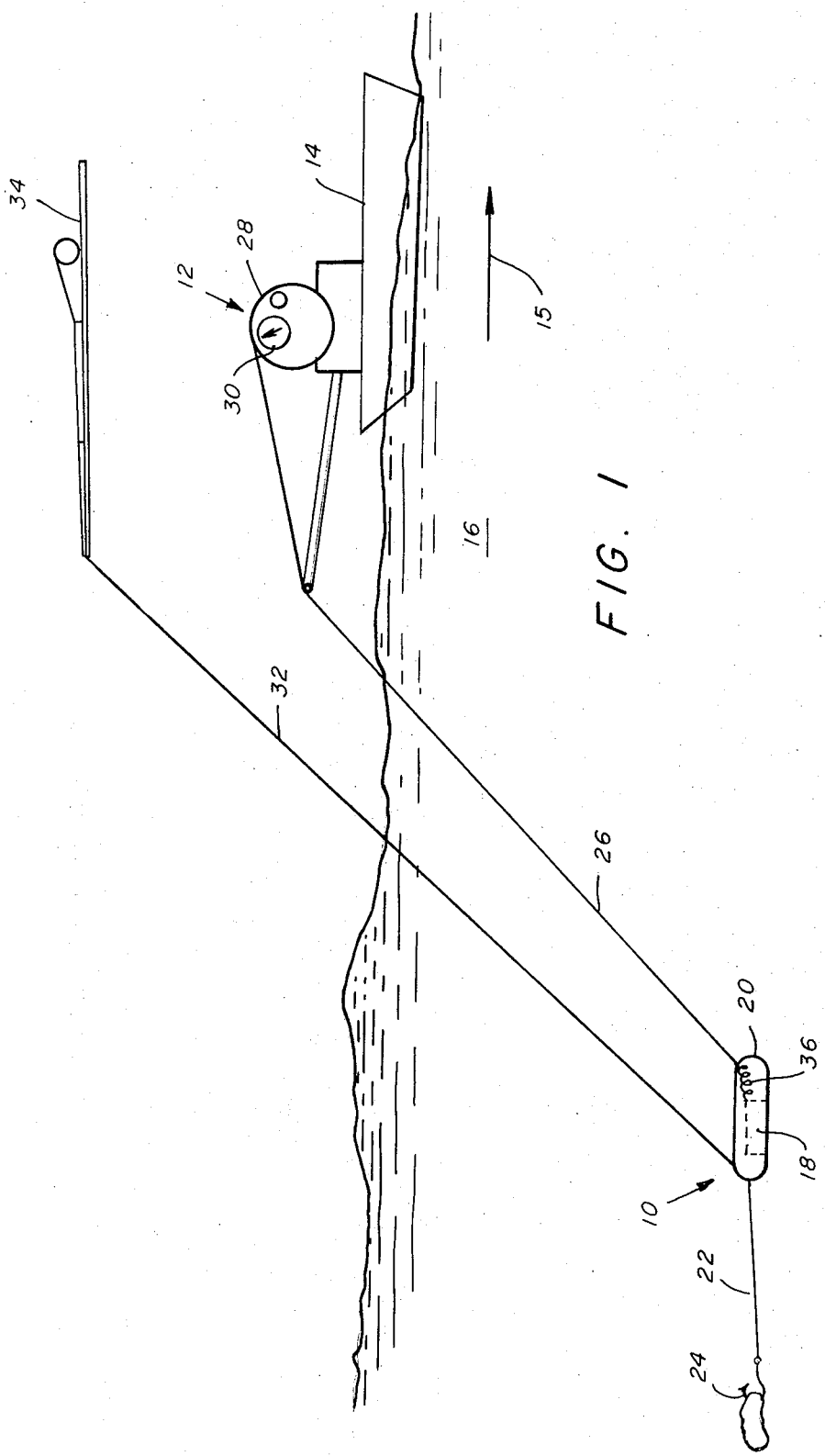
FIG. 1 shows a general view of the trolling boat, the cable reel and the probe trailing behind the boat.

Referring now to the drawings, numeral 10 indicates generally the probe which is carried behind the trolling boat 14. Numeral 12 indicates generally the motor-driven servo-controlled cable drum or reel mounted on the boat 14 which is supported on the surface of the body of water 16. The boat travels in the direction of arrow 15.

Fishermen, in general, know that fish of a certain species will prefer to remain in water of a certain temperature. Thus in trolling for this species of fish they will try to maintain the fish hook and bait 24 at such a depth that it will be within water of the temperature most desired by the species of fish. The fish hook and bait 24 are attached to a fish line 22 which is attached to a probe 20 in which is housed a thermoresistive sensor 18 the leads from which 36 pass up through the support cable 26 to a drum 28 on the boat 14. Motor means, not shown but well known in the art, are provided to rotate the drum in response to the output of a servo amplifier which will be described in connection with FIG. 2. If the temperature indicated by element 18 is too high the servo amplifier will cause the motor to drive the reel in such a way as to reel out cables 26 thus the probe will drop to a greater depth and therefore to water of a lower temperature. If the temperature indicated by the thermo sensor 18 is too low, then the servo amplifier will cause the cable to be reeled in and the probe will troll at a shallower depth, in water of higher temperature.

Of course, as the boat varies in speed if the length of cable 26 is maintained constant the depth at which the probe trolls will vary. At higher speeds it will troll at a shallower depth and vice versa. Thus the automatic control provided by the servo amplifier serves to maintain the proper depth irrespective of whether the change in recorded temperature is due to the water or is due to the speed of the boat or to any other cause.

Figure 2:
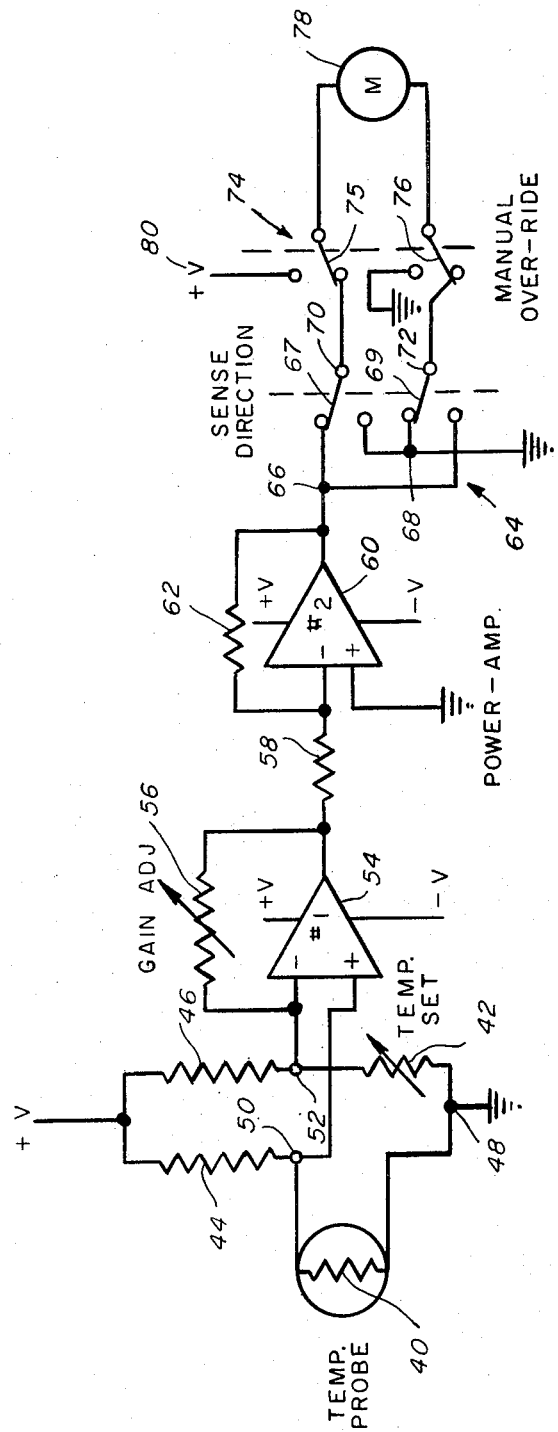
FIG. 2 is a circuit diagram illustrating the details of the servo amplifier.

A fish line 32 and fishing pole 34 can be connected to the probe 20 so that various activities can be taken care of while the probe is at the depth selected. It will be clear that the probe must be denser than water so that it will sink to the maximum depth permitted by the length of cable 26 and the speed of the boat, which moves in the direction of arrow 15. Referring now to FIG. 2, there is shown in schematic form a circuit diagram of the servo amplifier and motor drive. The temperature probe 40 comprises a thermo-resistive element which changes resistance as a function of temperature. This is inserted into a bridge network which comprises two equal resistances 44 and 46 and one variable resistance in the form of a potentiometer 42. Thus the four resistances form a bridge with voltage plus V applied at one end and ground connection 48 at the other end. At the two other terminals of the bridge 50 and 52 connections are taken to a sensing amplifier 54 which has a gain adjustment in feedback resistor 56. Voltages +V and −V are applied to this amplifier 54. Such sensing amplifiers indicated by the numeral 54 are available on the market, and are well known in the art and anyone of those commercially available could be used in this application.

It is therefore not necessary to provide a detailed description of the amplifier 54. The output is applied through resistance 58 to the input of a power amplifier 60 which is connected between the resistance 58 and ground. The power amplifier 60 has a gain adjusting feedback resistance 62. Again plus and minus voltages are provided for the amplifier, the magnitude of which are in accordance with the specific design of the amplifier. Since there are many varieties of power amplifiers on the market these will not be described in detail. Suffice it to say that the output of the power amplifier 66 is a direct voltage, the polarity of which is a function of the resistance of the probe 40, compared to the resistance of the potentiometer 42. By setting the resistance of 42 to correspond to what the resistance of the probe would be at the selected temperature, the polarity of the output of the power amplifier will be such as to control the raising and lowering of the probe in accordance with the output signal of the bridge which is a function of the difference between the two resistances 40 and 42. The potential at point 66 goes to a sense direction switch 64 and through a manual override switch 74 to the drive motor 78. Thus polarity changes at point 66 will cause motor 78 to run in a forward or a reverse direction in accordance with the polarity. If the sense direction is not correct, that is, if the motor tends to drive the probe lower when the temperature of the probe is already too low, then the switch 64 is reversed. In which case the motor then will raise the probe when its temperature is too low.

The manual override switch 74 is a manual switch in which the switch blade 75 and 76 connected to the motor can be raised from their presently indicated position where they are connected to the power amplifier and will then be connected between a separate source of voltage 80 and ground. The polarity of the voltage 80 is such as to reel in the cable, so that in case of the failure of the servo amplifier to control the motor properly the manual switch 74 is thrown which will cause the motor to turn in a direction to reel in the cable and to bring the probe up to the boat.

It will be clear that in apparatus of this sort it is desirable to have limit switches so that when the cable is reeled in or reeled out a limit switch will be operated so as to stop the motor and prevent damage to the apparatus. However, this art is well known and need not be described further.

It will be clear also that manual switch 74 could be a double throw switch like switch 64 in which case the manual control of the motor 78 could be in two directions of operation, so that the actual position of the probe could be controlled manually in case of failure of the servo apparatus.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. An automatic fish line downrigger comprising:
   a. temperature sensing means;
   b. housing means for housing said temperature sensor, said housing of negative buoyancy;
   c. tensile means connecting said housing means to a motor driven reel means on a boat, said boat adapted to tow said housing through the water;
   d. fish hook means connected to said housing means; and
   e. electrical conductor means connected from said sensing means in said housing means to servo amplifier means and means connecting said servo amplifier means to motor means for driving said reel means;
   whereby said motor means is responsive to said servo amplifier means which is responsive to said temperature sensor and will control the length of said tensile means to permit said housing to seek a depth of immersion in which the water is a preselected temperature.

2. The downrigger as in claim 1 in which said tensile means comprises a cable including electrical conductors for transmitting the output signal of said sensor.

3. The downrigger as in claim 1 in which said servo amplifier includes a resistance bridge input in which said sensor comprises one leg of said bridge.

4. The downrigger as in claim 1 including switch means to reverse the direction of response of said motor to said sensor.

5. The downrigger as in claim 1 including manual override means to reel in said housing.

6. The downrigger as in claim 1 including fish line means from said boat to said housing.

* * * * *